United States Patent [19]

Tihanyi

[11] Patent Number: 5,044,987
[45] Date of Patent: Sep. 3, 1991

[54] MOUNTING PLATE FOR TELECOMMUNICATIONS WALL OUTLET

[75] Inventor: George Tihanyi, Montreal, Canada

[73] Assignee: Northern Telecom Limited, Montreal, Canada

[21] Appl. No.: 463,052

[22] Filed: Jan. 10, 1990

[51] Int. Cl.[5] .............................. H01R 13/74
[52] U.S. Cl. .................................. 439/560; 29/844; 439/536
[58] Field of Search .................. 174/58; 220/34, 36; 439/535, 536, 538, 560; 29/844

[56] References Cited

U.S. PATENT DOCUMENTS

| | | | |
|---|---|---|---|
| 4,451,106 | 5/1984 | Wiseheart et al. | 439/536 |
| 4,673,235 | 6/1987 | Conley | 439/576 |
| 4,892,212 | 1/1990 | Andreyko | 174/58 X |

Primary Examiner—Eugene F. Desmond
Attorney, Agent, or Firm—R. J. Austin

[57] ABSTRACT

A mounting plate for securing a telecommunications wall outlet to a wall panel; a method of installing a telecommunications wall outlet; and an assembly of a telecommunications wall outlet, a mounting plate and a wall panel. The mounting plate has a planar element having ends and sides which surround an aperture through the planar element. Each end of the planar element provides at least one bendable tab for securing the mounting plate to a wall panel and also means for attaachment of a faceplate of a telecommunications outlet. The mounting plate is installed through an aperture cut in a wall panel which corresponds to the aperture through the mounting plate. The planar element is secured against the inner surface of the wall panel by the bendable tabs at each end of the planar element.

7 Claims, 5 Drawing Sheets

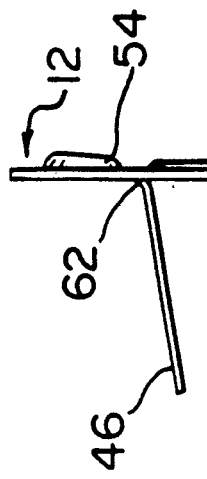
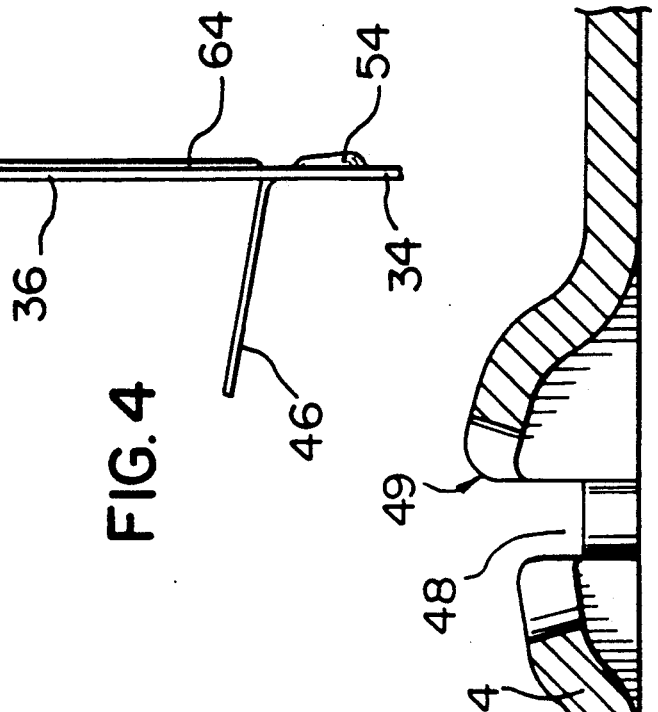
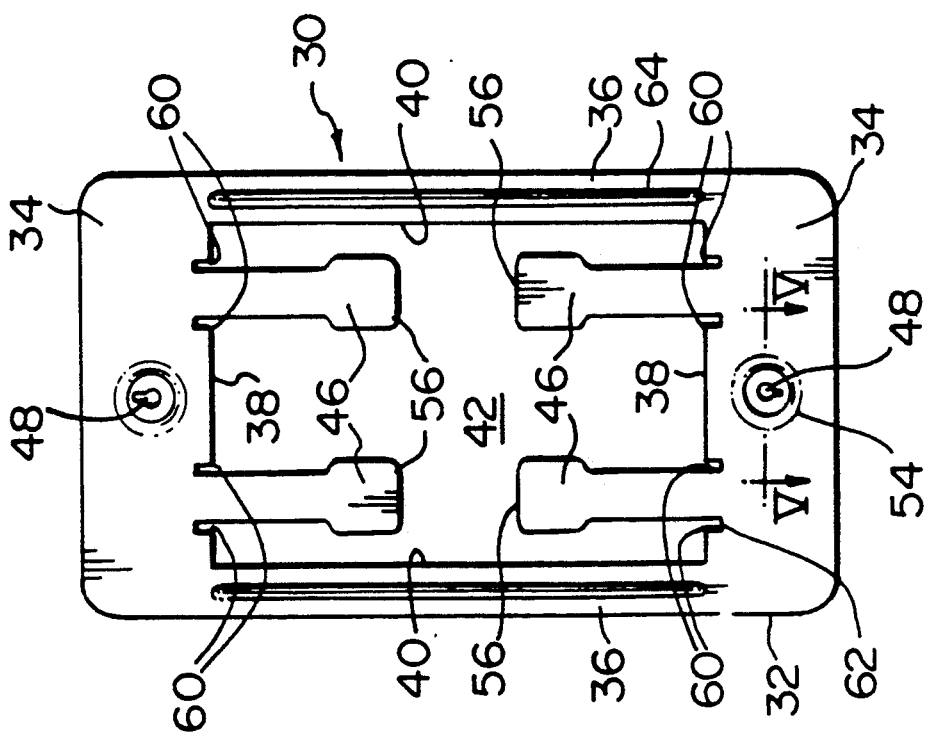

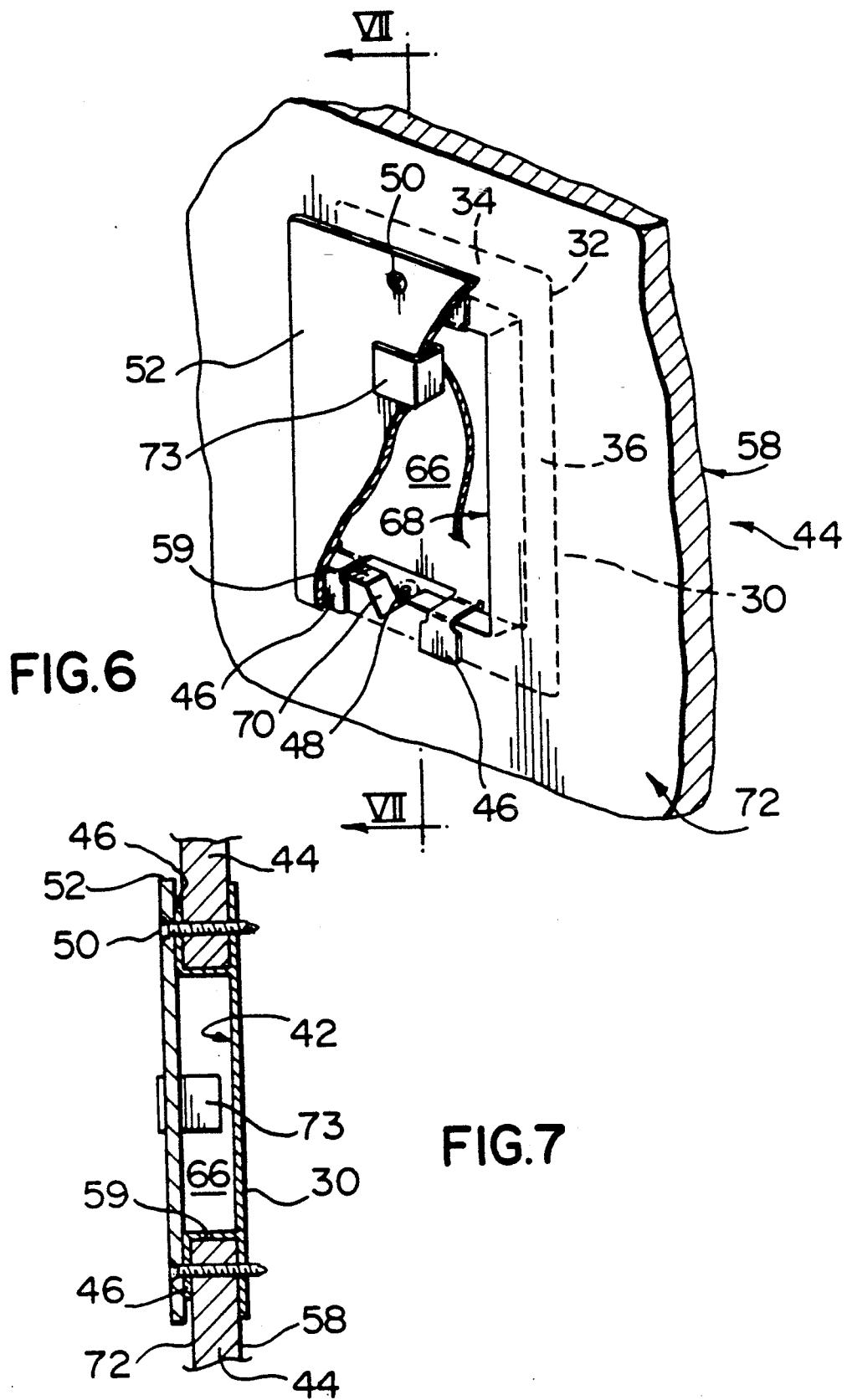

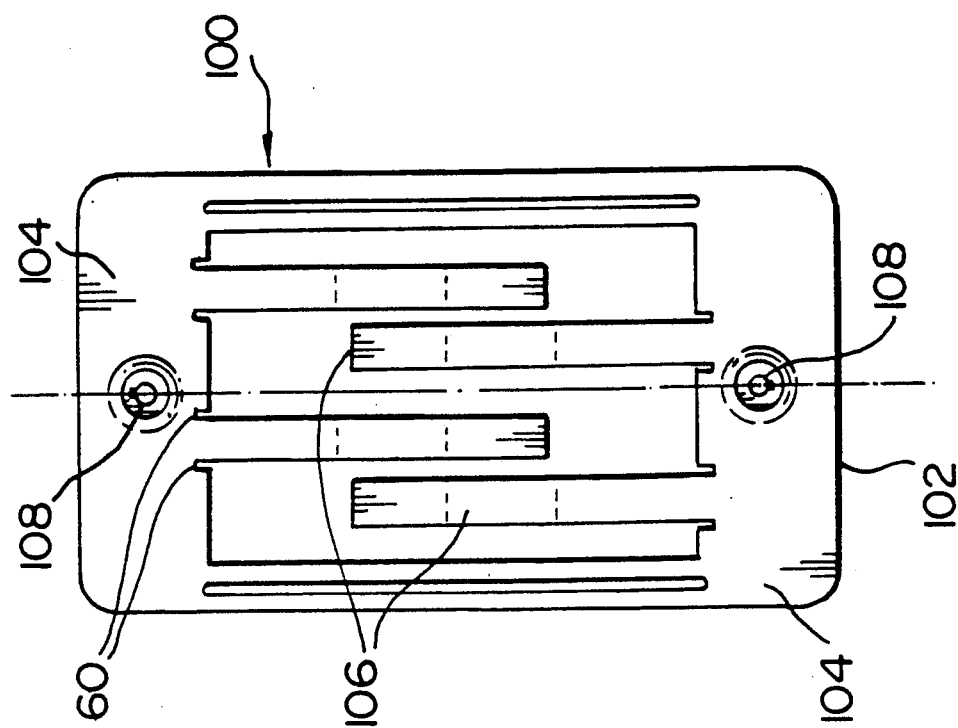
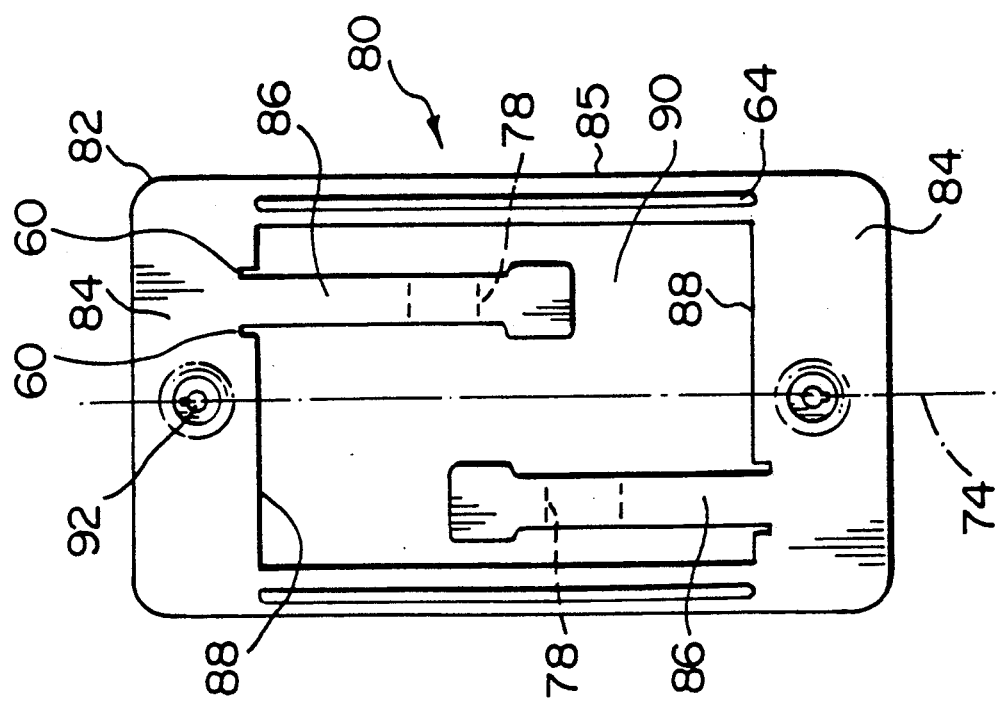

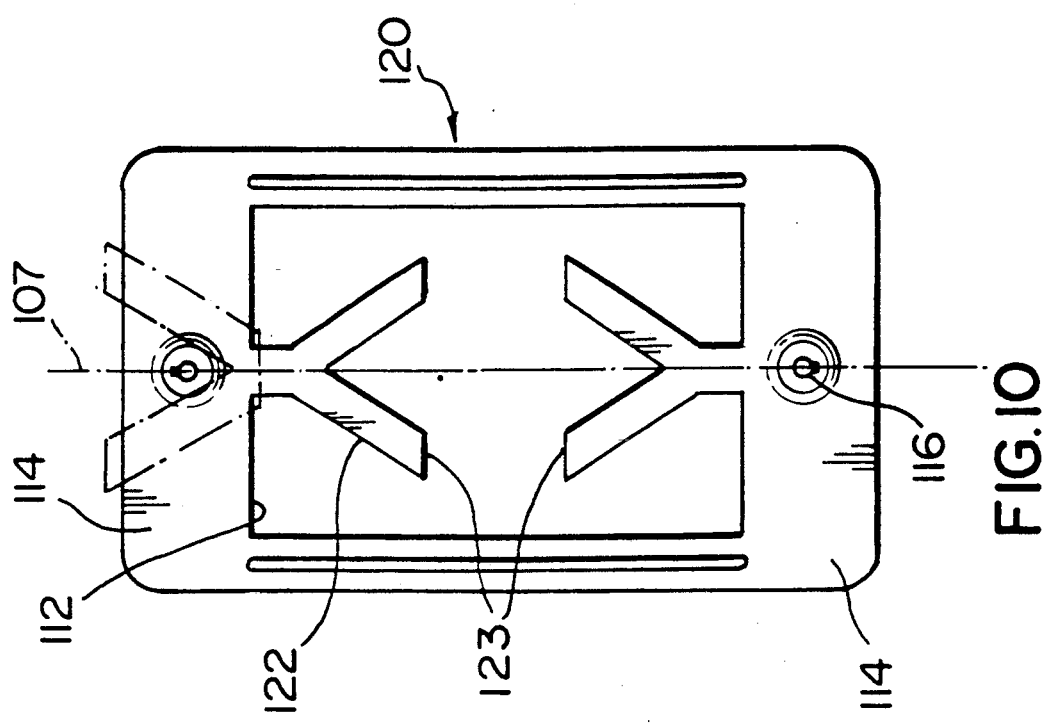

MOUNTING PLATE FOR TELECOMMUNICATIONS WALL OUTLET

This invention relates to mounting plates for telecommunications wall outlets.

Conventionally telecommunications wall outlets may be wall mounted using a standard electrical wall outlet box secured to a stud within a wall. The necessary connections in the telecommunications wall outlet between an incoming cable and connectors, i.e. industry standard modular jacks, are made within the outlet box, and a faceplate of the outlet for carrying the connectors is secured by screws to threaded holes provided in the outlet box. Recently, an alternative to the outlet box structure is being used. In this alternative, a faceplate carrying a telecommunications connector is mounted on a mounting plate which is secured directly to a drywall panel of a wall. A mounting plate of a known structure comprises a rectangular planar member, of sheet metal, having two ends and sides which are all coplanar and which surround a rectangular aperture. Each of two opposite sides of the member have a pair of bendable tabs extending into the aperture and in the plane of the member. For installation, the bendable tabs are bent out of the plane of the member so that when the mounting plate is mounted with its sides against the front surface of a drywall panel facing into a room, and with the aperture through the mounting plate aligned with a corresponding aperture cut through the drywall panel, the tabs are inserted through the aperture in the drywall panel. The mounting plate is secured to the drywall panel by bending the tabs around the cut edges defining the aperture in the drywall panel and along the rear surface of the drywall panel, i.e. the surface abutting studding which supports the drywall panels. A faceplate is attached to the mounting plate by screws extending through holes in the mounting plate.

Although mounting plates of known structure are economical to manufacture and are easily installed, bendable tabs may allow some movement of a mounting plate on the wall, and with continued use, the mounting plate may work loose. Loosening may be effected when pulling out a plug or pulling on a cable plugged into a connector because sufficient leverage tends to urge the mounting plate away from the wall and deform the tabs, reducing their hold upon the wall.

The present invention seeks to provide a mounting plate for a telecommunications wall outlet which, in use, avoids or reduces the above problem.

According to one aspect of the present invention, a mounting plate for a telecommunications wall outlet is provided comprising a planar element having two opposite ends and sides extending between the ends, the sides and ends having edges defining and surrounding an aperture for access through the planar element; and each end of the planar element provides: means for attachment of a faceplate of a wall outlet for carrying a telecommunications connector of the wall outlet, and at least one bendable tab extending from the aperture defining edge of the end for securing the mounting plate to a wall panel.

In the mounting plate of the present invention, by placing the at least one bendable tab and also the means for attachment of a faceplate at each end of the mounting plate, the mounting plate is held securely to the wall at each end of the planar element, near the point where the faceplate is to be attached. The leverage distance between the means for attachment of a faceplate and the at least one bendable tab is therefore reduced to a minimum. A bendable tab extending from the end of the planar element is therefore more effective in holding the planar element supported by the wall and resisting forces which act on the attachment means and tend to pull the mounting plate away from the wall.

According to another aspect of the invention, there is provided a mounting plate for a telecommunications wall outlet comprising a planar element having two opposite ends and sides extending between the ends, the sides and ends having edges defining and surrounding an aperture for access through the planar element; and each end of the planar element provides: means for securing the mounting plate to a wall panel comprising a pair of bendable tabs extending from the aperture defining edge of the end; and means for attachment of a faceplate of a wall outlet for mounting a telecommunications connector of a wall outlet, the attachment means being in a position in the end between the two bendable tabs.

Preferably, the means for attachment of a faceplate comprises a hole in each end in a position between the two bendable tabs, the hole being for receiving a screw for securing a faceplate to the mounting plate. Alternatively, the attachment means for the faceplate comprises a resilient latch means.

The mounting plate of the invention may be carried upon the front surface of the wall panel while obtaining the above discussed advantages.

According to a further aspect of the invention, there is provided an assembly of a telecommunications wall outlet, a mounting plate and a wall panel comprising: a telecommunications wall outlet comprising a faceplate and a telecommunications connector carried upon the faceplate; a wall panel having a front surface facing into a room and a rear surface abutting a wall support structure; and a mounting plate for the telecommunications wall outlet wherein the mounting plate comprises a planar element having two opposite ends and sides extending between the ends, the sides and ends having edges defining and surrounding an aperture for access through the planar element, and at least one bendable tab extends from the aperture defining edge at each end of the planar element; the mounting plate having been mounted through an aperture in the wall panel and with the ends and sides of the planar element abutting the rear surface of the wall panel with the aperture in the mounting plate aligned with the aperture in the wall panel which corresponds to the aperture in the mounting plate, and with the bendable tabs extending through the wall panel aperture and bent around an aperture defining edge of the wall panel and along the front surface of the wall panel so as to sandwich the wall panel between the bendable tabs and the ends of the planar element to hold the mounting plate in a desired position on the wall panel; and the faceplate positioned over the aligned apertures and on the front surface of the wall panel and being secured to the ends of the planar element so as to urge the said ends against the rear surface of the wall panel whereby the faceplate and the mounting plate cooperate to hold the mounting plate immovably in the wall.

Thus, when a mounting plate of the present invention is mounted on a wall panel with the planar element abutting the rear surface of the wall panel and with the bendable tabs extending outwards from the aperture and along the front surface of the wall panel to hold the mounting plate in the desired position, engagement of the rear surface of the wall panel by the planar element resists forces which would tend to pull the assembly away from the front surface of the wall panel. When a mounting plate of the present invention is mounted on a wall panel in this way and the faceplate on the front surface of the wall is secured to the mounting plate, for example, with screws passing through the faceplate, through the wall panel and into screw receiving holes in the ends of the planar element, the wall is sandwiched between the faceplate and the ends of the mounting plate and cooperation of the faceplate secured to the mounting plate acts to clamp the mounting plate immovably to the wall panel.

Also, because the leverage distance is minimized between the means of attachment of a faceplate and the bendable tab, the tendency for distortion to occur in the mounting plate during attachment or detachment of the faceplate is also minimized.

According to another aspect of the invention, there is provided a method of installing a telecommunications wall outlet in a wall panel having a front surface facing into a room and a rear surface abutting a wall support structure, the method comprising: providing a telecommunications outlet comprising a faceplate and a telecommunications connector mounted upon the faceplate; providing a mounting plate comprising a planar element having two opposite ends and sides extending between the ends, the sides and ends having edges defining and surrounding an aperture for access through the planar element; and each end of the planar element providing means for attaching the faceplate, and at least one bendable tab extending from the aperture defining edge of each end for securing the mounting plate to the wall panel; inserting the mounting plate through an aperture in the wall panel corresponding to the aperture in the mounting plate and locating the mounting plate with the planar element abutting the rear surface of the wall panel; bending each of the bendable tabs around an aperture defining edge of the wall panel bordering the aperture in the wall panel and along the front surface of the wall panel to sandwich the wall panel between the ends of the planar element and the bendable tabs to hold the mounting plate in a desired position on the wall panel member with the two apertures aligned; placing the faceplate on the front surface of the wall panel over the aligned apertures; and attaching the faceplate to the attachment means at the ends of the mounting plate so that the planar element is urged against the inner surface of the wall panel, thereby holding the mounting plate and faceplate immovably on the wall.

Embodiments of the invention will now be described by way of example, with reference to the accompanying drawings, in which:

FIG. 3 is a plan view of a mounting plate for a telecommunications wall outlet and according to a first embodiment of the present invention;

FIG. 4 is a side view of the mounting plate of the first embodiment;

FIG. 5 is an enlarged cross sectional view, along line V—V in FIG. 3, of part of the mounting plate of the first embodiment showing a detail;

FIG. 6 is a perspective view of an assembly of the telecommunications wall outlet, a wall panel and the mounting plate of the first embodiment;

FIG. 7 is a vertical cross sectional view through the assembly along line VII—VII shown in FIG. 6.

FIG. 8 is a plan view of a mounting plate for a telecommunications wall outlet and according to a second embodiment; and FIGS. 9 and 10 are plan views of mounting plates according to third and fourth embodiments of the invention.

Figure 1:
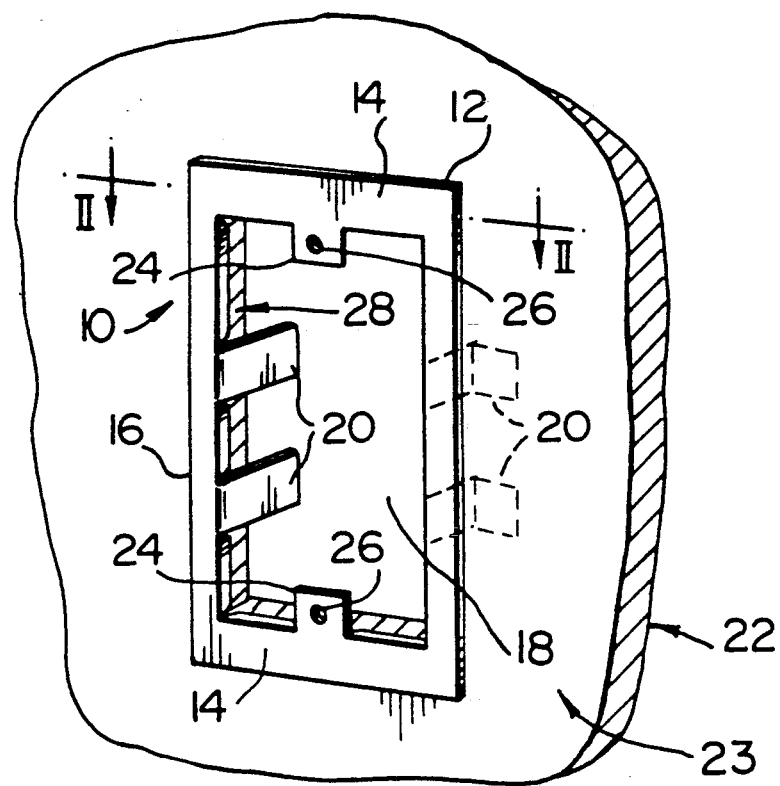
FIG. 1 is a perspective view of a mounting plate of prior art structure mounted on a wall.

A mounting plate 10 for a telecommunications wall outlet and of prior art structure, as shown in FIG. 1, comprises a rectangular planar element 12, stamped from sheet metal, and having two opposite ends 14 and sides 16 surrounding a rectangular aperture 18. Two bendable tabs 20 extend from each side 16 of the planar element and screw receiving holes 26, for securing a faceplate (not shown in FIG. 1) by means of screws, are provided through extensions 24 of each end 1 of the planar element 12.

The mounting plate is intended for installation on a interior wall of the type known as drywall or studwall construction which comprises wall panels of drywall or other panelling material mounted on a wall support structure. The support structure is generally wooden studding or a steel framework.

Figure 2:
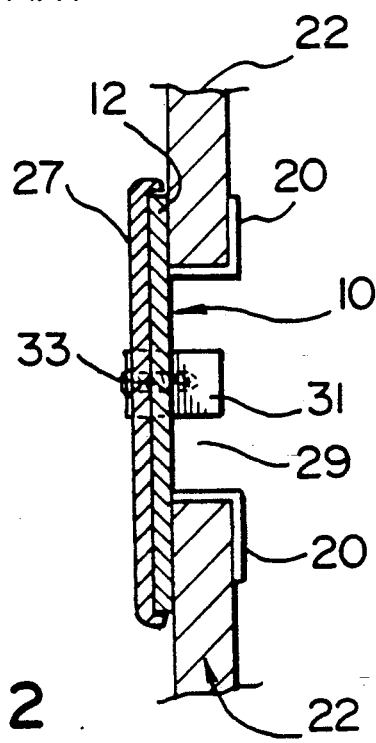
FIG. 2 is a cross sectional view along line II—II through an assembly of the prior art mounting plate and a wall with a telecommunications wall outlet.

In an assembly of a telecommunications wall outlet, the mounting plate 10 and a wall panel 22 (FIG. 2), the mounting plate 10 is mounted with the planar element 12 on a front surface 23, of the wall panel 22, i.e. the surface facing into a room. The aperture 18 through the planar element 12 is aligned with an aperture 29 cut in the wall panel 22 which corresponds in size and shape to the aperture 18 through the planar element 12. The bendable tabs 20 are bent out of the plane of the planar member to extend through the aperture 29 in the wall panel. Two of the bendable tabs 20 are shown, in full outline in FIG. 1, in their normal positions before fitting of the mounting plate to a wall. The other two bendable tabs 20 are shown extending through the aperture 29 in the wall and bent around aperture defining edges 28 of the wall panel 22 and along the rear surface 25 of the wall panel 22 which faces a wall support structure, so that the bendable tabs hold the planar element in the desired position on the wall panel.

In use, a faceplate 27 for carrying a connector of a telecommunications outlet (FIG. 2) also comprising a connector 31, i.e. a modular telephone jack, is secured by screws 33 to extensions 24 of the ends 14 of the mounting plate 10. The assembly is held in position on the wall only by the bendable tabs 20. Forces applied to an end 14 of the planar element 12, such as when removing a plug from the connector 31 carried by the faceplate will tend to pull upon and deform the bendable tabs 20 and loosen their hold on the wall. This situation is aggravated because of the distance between the extensions 24 and the tabs 20 so that application of force to the ends 14 of the planar element may produce a large bending moment and distort the planar element 12.

In a first embodiment of the present invention, and as shown in FIGS. 3 to 5, a mounting plate 30 for a telecommunications wall outlet comprises a rectangular planar element 32 having two opposite ends 34 and sides 36 extending between the ends, the sides 36 and ends 34 being coplanar and having edges 38 and 40 defining and surrounding a rectangular aperture 42 through the planar element. Each end 34 provides means for securing the mounting plate 30 to a wall panel, this securing means comprising a pair of bendable tabs 46 extending from the edge 38 of the end 34 into the aperture 42 towards the opposite end. Each end of the mounting plate 34 provides means for attachment of a faceplate of a telecommunications wall outlet, as will be described. The attachment means at each end comprises a notched hole 48 in the end, and a flared dimple 54 is formed around the notched hole 48 so that the edge 49 of the hole forms part of a screw thread, as shown in FIG. 5.

The bendable tabs 46 extend to a free end 56 and are of a suitable length to be bent, as will be described, around an aperture defining cut edge 59 of a drywall panel of a standard thickness, and also to extend along the inner surface 58 of the drywall panel. The tabs 46 have a contoured shape which widens towards the free end 56 of the tab at a distance from the edge 38 of the planar element 32 corresponding approximately to the thickness of the drywall panel, for example in this case a distance 0.625" [⅝"] away from the edge, and the contour therefore acts as a guide for bending the tab 46 around the drywall edge. The corners of the planar element 32 and of the bendable tabs 46 may be rounded as shown in the figures to eliminate sharp edges for the comfort of the installer. A notch 60 is cut at each side of the junction 62 of the tabs 46 with the edge 38 of the planar element 32 to facilitate bending of the tabs along the boundary of the aperture 42 of the planar element 32. A reinforcing pressed rib 64 is formed extending along each side 36 of the mounting plate 30 to provide rigidity to the planar element 32. The mounting plate 30 is economically produced by stamping from sheet metal having a thickness such as 22 AWG.

For installation of the mounting plate 30 on a wall panel 44, as shown in FIGS. 6 and 7, an aperture 66 for access through the drywall panel and corresponding in shape and size to the aperture 42 in the mounting plate 30, is cut out of the drywall panel. The mounting plate 30 may be used as a template to mark the outline for cutting the aperture in the drywall panel. The mounting plate 30 is inserted through the aperture 66 in the wall panel and positioned so that the planar element 32 abuts the rear surface 58 of the wall panel, i.e. the surface which faces the wall studding or support structure (not shown), and so that the tabs 46 extend out through the aperture 66 in the wall panel. Notches 70, cut away in the aperture defining edges 59 of the drywall panel, provide access to the holes 48. The tabs 46 are then bent outwards around the aperture defining edges 59 of the drywall panel and along the outer surface 72 of the drywall panel to secure the mounting plate 30 in the wall with apertures 42 and 66 aligned. A faceplate 52 of a telecommunications wall outlet is secured by screws 50 which pass through the faceplate 52, through the notches 70 in the drywall panel 44 and into screw threaded engagement with the holes 48 in the ends 34 of the mounting plate 30 (FIGS. 6 and 7). The telecommunications wall outlet also comprises a telecommunications connector, i.e. an industry standard modular jack 73, as used for data and voice communications systems. With the faceplate 52 secured to the mounting plate 30, the drywall panel 44 is sandwiched and gripped between the faceplate 52 and the ends 34 of the tabs 46 on the front surface 72 of the drywall panel and the ends 34 of the mounting plate 30 on the other surface 58 of the drywall panel to hold the mounting plate 30 immovably on the wall panel. Thus the mounting plate is firmly attached to the wall panel and provides a secure mounting for the telecommunications wall outlet. Application of a force, in the removal direction, to the faceplate, such as when removing a plug from a modular jack of the outlet carried by the faceplate, is effectively resisted because the planar element 32 of the mounting plate lies against the rear surface 58 of the wall panel and also because the bendable tabs and the attachment means are located at each end of the planar element and are close together, and it is unlikely that sufficient leverage or bending moment to cause distortion or bending of the mounting plate will be produced.

Mounting plates of other embodiments now to be described have the same advantages in use as the mounting plate of the first embodiment.

In a second embodiment (FIG. 8), intended for use with wall panels of thickness greater than about 1", such as insulated drywall panels, a mounting plate 80 has a structure similar to that described in the first embodiment except that at each end 84 of a planar element 82 there is a single tab 86 extending from edge 88 of the end 84 into the aperture 90 and adjacent to a hole 92 for receiving a screw when attaching a faceplate (not shown). The tabs 86 extend more than half way across the aperture 90 towards the opposite end of the plate and so the two opposite facing tabs are offset from a centerline 74 of the planar element. Also, the tabs have perforations 78 so that they may be broken off, along a line of perforations, to a desired length, depending on the thickness of the drywall panel.

In a third embodiment (FIG. 9) a mounting plate 100 is provided which is similar to that of the second embodiment except that a pair of bendable tabs 106 extend from each end 104 of the planar element 102 and the means for attachment comprises a hole 108 in each end 104 in a position between the two bendable tabs.

FIG. 10 shows a mounting plate 110 of a fourth embodiment, the mounting plate 110 being symmetrical about a longitudinal centerline 107 and in that at each end a single bendable tab 122 extends from the edge 112 and the center of each end 114. Each bendable tab 122 is bifurcated and extends to free ends 123. The position of one of the bendable tabs in use is shown by the chain dotted outline, with access to the hole 116 for attachment of a faceplate (not shown) being provided between the two free ends 123 of each tab 122.

In modifications (not shown) of any of the above described embodiments, means for attachment of a faceplate to the mounting plate comprises a latch engaging surface at each end of the mounting plate, and in an assembly of a mounting plate, a telecommunications wall outlet and a wall panel, a faceplate is secured to the mounting plate by resilient latches extending from the faceplate and engaging the latch engaging surfaces at each end of the mounting plate.

What is claimed is:

1. A mounting plate for a telecommunications wall outlet comprising:
   a planar element having two opposite ends and sides extending between the ends, the sides and ends having edges defining and surrounding an aperture for access through the planar element; and
   at least one bendable tab which extends from each end of the planar element at the aperture defining edge of each end for securing the planar element against a surface of a wall panel;
   each end of the planar element providing a means for attachment of a faceplate of a wall outlet for carrying a telecommunications connector of the wall outlet, and each tab being spaced laterally in the plane of the ends of the means for attachment of the faceplate.

2. A mounting plate for a telecommunications wall outlet comprising:

a planar element having two opposite ends and sides extending between the ends, the sides and ends having edges defining and surrounding a boundary of an aperture for access through the planar element; and at least one bendable tab which extends from each end of the planar element at the aperture defining an edge of each end for securing the planar element against a surface of a wall panel;

each end of the planar element providing means for attachment of a faceplate of a wall outlet for carrying a telecommunications connector of the wall outlet, and each tab being spaced laterally of the means for attachment of a faceplate in planes parallel to the plane of the ends; and notches being formed in the aperture defining edges of each end, the notches extending one along each side of a respective tab to facilitate bending of the tabs relative to the planar element without deforming ends of the planar element.

3. An assembly of a telecommunications wall outlet, a mounting plate and a wall panel comprising:

a telecommunications wall outlet comprising a faceplate and a telecommunications connector carried upon the faceplate;

a wall panel having a front surface facing into a room and a rear surface abutting a wall support structure; and a mounting plate for the telecommunications wall outlet wherein the mounting plate comprises a planar element having two opposite ends and sides extending between the ends, the sides and ends having edges defining and surrounding an aperture for access through the planar element and at least one bendable tab extends from the aperture defining edge at each end of the planar element;

the mounting plate having been mounted through an aperture in the wall panel and with the ends and sides of the planar element abutting the rear surface of the wall panel, with the aperture in the mounting plate aligned with the aperture in the wall panel which corresponds to the aperture in the mounting plate and with the bendable tabs extending through the wall panel aperture and being bent around an aperture defining edge of the wall panel and along the front surface of the wall panel so as to sandwich the wall panel between the bendable tabs and the ends of the planar element to hold the mounting plate in a desired position on the wall panel; and the faceplate positioned over the aligned apertures and on the front surface of the wall panel and being secured to the ends of the planar element so as to urge the said ends against the rear surface of the wall panel whereby the faceplate and the mounting plate cooperate to hold the mounting plate immovable in the wall with the wall panel sandwiched between the faceplate and the ends of the planar element.

4. An assembly according to claim 3 wherein two bendable tabs extend from the aperture defining edge of each end of the planar element, and the faceplate is positioned over the aligned apertures and on the front surface of the wall panel and secured to each end of the planar element, between the bendable tabs.

5. A mounting plate for a telecommunications wall outlet comprising:

a planar element having two opposite ends and sides extending between the ends, the sides and end having edges defined and surrounding an aperture for access through the planar element; and a pair of bendable tabs which extends from each end of the planar element at the aperture defining edge of each rend for securing the planar element against a surface of a wall panel;

each end of the planar element providing means for attachment of a faceplate of a wall outlet for carrying a telecommunications connector of the wall outlet, the attachment means being in a position in the end of the planar element spaced laterally of the bendable tabs in planes parallel to the plane of the ends and lying between the bendable tabs.

6. A mounting plate for a telecommunications wall outlet according to claim 5 wherein the means for attachment of a faceplate comprises a screw receiving hole in each end of the planar element in a position between the two bendable tabs.

7. A method of installing a telecommunications wall outlet in a wall panel having a front surface facing into a room and a rear surface abutting a wall support structure, the telecommunications outlet comprising a faceplate and a telecommunications connector mounted upon the faceplate; the method comprising:

providing a mounting plate comprising a planar element having two opposite ends and sides extending between the ends, the sides and ends having edges defining and surrounding an aperture for access through the planar element;

and each end of the planar element providing means for attaching the faceplate, and at least one bendable tab extending from the aperture defining edge of each end for securing the mounting plate to the wall panel;

inserting the mounting plate through an aperture in the wall panel corresponding to the aperture in the mounting plate and locating the mounting plate with the planar element abutting the rear surface of the wall panel;

bending each of the bendable tabs around an aperture defining edge of the wall panel bordering the aperture in the wall and along the front surface of the wall panel to sandwich the wall panel between the ends of the planar element and the bendable tabs to hold the mounting plate in a desired position on the wall panel member with the two apertures aligned;

placing the faceplate over the aligned apertures on the front surface of the wall panel;

attaching the faceplate to the attachment means at the ends of the mounting plate so that the planar element is urged against the inner surface of the wall panel, thereby holding the mounting plate and faceplate immovable on the wall panel with the wall panel sandwiched between the faceplate and the ends of the planar element.

* * * * *